United States Patent
Meerdink et al.

(10) Patent No.: US 12,178,215 B2
(45) Date of Patent: Dec. 31, 2024

(54) FOOD PROCESSING SYSTEM FOR PROCESSING CARCASS PARTS

(71) Applicant: MAREL MEAT B.V., Boxmeer (NL)

(72) Inventors: Jan Meerdink, Boxmeer (NL); Franciscus Theodorus Henricus Johannes Van Der Steen, Boxmeer (NL); Frans Van Den Hurk, Boxmeer (NL)

(73) Assignee: MAREL MEAT B.V., Boxmeer (NL)

( * ) Notice: Subject to any disclaimer, the term of this patent is extended or adjusted under 35 U.S.C. 154(b) by 23 days.

(21) Appl. No.: 18/265,808

(22) PCT Filed: Dec. 15, 2021

(86) PCT No.: PCT/NL2021/050764
§ 371 (c)(1),
(2) Date: Jun. 7, 2023

(87) PCT Pub. No.: WO2022/131913
PCT Pub. Date: Jun. 23, 2022

(65) Prior Publication Data
US 2024/0032548 A1 Feb. 1, 2024

(30) Foreign Application Priority Data
Dec. 18, 2020 (NL) ........................... 2027156

(51) Int. Cl.
*A22B 7/00* (2006.01)
*A22B 5/00* (2006.01)

(52) U.S. Cl.
CPC ............ *A22B 7/003* (2013.01); *A22B 5/0029* (2013.01); *A22B 7/002* (2013.01)

(58) Field of Classification Search
CPC .......... A22B 7/003; A22B 5/0029; A22B 7/02
(Continued)

(56) References Cited

U.S. PATENT DOCUMENTS

| 3,811,152 A | 5/1974 | Herubel |
| 4,389,749 A | 6/1983 | Korhonen |

(Continued)

FOREIGN PATENT DOCUMENTS

| EP | 0590733 A1 | 4/1994 |
| EP | 0898894 A2 | 3/1999 |

(Continued)

OTHER PUBLICATIONS

Dutch Search Report from corresponding Dutch Patent Application No. NL2027156, Sep. 9, 2021.
(Continued)

*Primary Examiner* — Richard T Price, Jr.
(74) *Attorney, Agent, or Firm* — Workman Nydegger

(57) ABSTRACT

A food processing system and a method, includes: an overhang rail system having a plurality of spaced apart shackles designed for carrying carcass parts such that the carcass parts are at least partly freely hanging, a re-positioning apparatus having an engagement structure selectively moveable by a moving mechanism, and at least one food processing device for performing at least one food processing step on the carcass parts while the carcass parts are conveyed past the at least one food processing device. The plurality of spaced apart shackles and the engagement structure move in a synchronized manner. The engagement structure is configured to engage the carcass parts at a position different from the carrying position of the shackle and adjusting the angular position relative to a vertical axis from an initial angular position to a pre-defined angular processing position.

14 Claims, 1 Drawing Sheet

(58) Field of Classification Search
USPC .......................................................... 452/160
See application file for complete search history.

(56) References Cited

U.S. PATENT DOCUMENTS

| | | | | |
|---|---|---|---|---|
| 4,570,295 | A * | 2/1986 | van Mil | A22C 21/0053 |
| | | | | 452/182 |
| 9,004,988 | B2 * | 4/2015 | Van Der Steen | A22B 7/003 |
| | | | | 452/125 |
| 10,278,401 | B2 | 5/2019 | Van Der Leest et al. | |
| 11,785,956 | B2 * | 10/2023 | Jacobs | A22C 17/02 |
| | | | | 452/157 |

FOREIGN PATENT DOCUMENTS

| | | | |
|---|---|---|---|
| EP | 0948895 | A2 | 10/1999 |
| EP | 1658774 | A1 | 5/2006 |
| EP | 2153727 | A1 | 2/2010 |
| EP | 2826378 | A1 | 1/2015 |
| WO | 2011074966 | A1 | 6/2011 |
| WO | 2014174121 | A1 | 10/2014 |
| WO | 2017016874 | A1 | 2/2017 |

OTHER PUBLICATIONS

International Search Report from corresponding PCT Application No. PCT/NL2021/050764, Feb. 24, 2022.

* cited by examiner

FOOD PROCESSING SYSTEM FOR PROCESSING CARCASS PARTS

FIELD OF THE INVENTION

The present invention relates to a food processing system and a method for processing carcass parts conveyed by an overhang rails system comprising plurality of spaced apart shackles designed for carrying carcass parts.

BACKGROUND OF THE INVENTION

Many of today's implemented slaughterhouses utilize overhang rail systems to convey carcass parts such as pig carcass parts hanging from shackles while being deboned.

Although more and more automation is visible in current overhang rail systems, still a large part of the deboning is performed manually by operators. The skills of the operators varies a lot which is reflected in quality of the deboning and the yield.

SUMMARY OF THE INVENTION

It is an object of embodiments of the invention to provide an improved and more automated food processing system and a method.

In general, the invention preferably seeks to mitigate, alleviate or eliminate one or more of the above-mentioned disadvantages of the prior art singly or in any combination. In particular, it may be seen as an object of embodiments of the present invention to provide a system that solves the above-mentioned problems, or other problems.

To better address one or more of these concerns, in a first aspect of the invention a food processing system is provided comprising:

an overhang rail system comprising plurality of spaced apart shackles designed for carrying carcass parts such that the carcass parts are at least partly freely hanging, a re-positioning apparatus comprising an engagement structure selectively moveable by a moving mechanism, and at least one food processing device for performing at least one food processing step on the carcass parts while the carcass parts are conveyed past the at least one food processing device, wherein the plurality of spaced apart shackles and the engagement structure move in a synchronized manner, wherein the engagement structure is configured to engage the carcass parts at a position different from the carrying position of the shackle and adjusting the angular position relative to a vertical axis from an initial angular position to a pre-defined angular processing position. The pre-defined angular processing position may be adapted for the subsequent food processing step when the food processing step is carried out. Or, in other words, in use of the food processing system, the pre-defined angular processing position may be optimized to the food processing step when the food processing step is carried out.

Accordingly, a simplified mechanical solution is provided to adjust the angular position of the carcass parts to the subsequent process to be performed on the carcass parts, whereby the yield may be maximized and less or even no manual labor may be needed.

The different position from the carrying position of the shackle is preferably below the carrying position of the shackle.

The term carcass part may according to the present invention be understood as any part from a slaughtered four-legged animal of type such as beef, lambs, pigs, e.g. a half carcasses, leg parts, hams, and shoulder parts of pigs.

In one embodiment, the at least one food processing device includes two or more food processing devices having associated two or more different pre-defined angular processing positions. Accordingly, different operations on the carcass parts, such as cutting, deboning or de-skinning or de-fatting operations may be performed fully automatically, with the aim of fully maximizing the yield and/or fulfill customers preferences how e.g. the carcass part is cut, de-skinned and/or de-fat.

The moving mechanism may be configured to move the engagement structure relative to the shackles such as e.g. parallel in the same direction or opposite direction to the conveying direction of the shackles, and/or to any angular direction relative to the conveying direction of the shackles, where the advancing speed of the engagement structure is controlled such that said pre-defined angular processing position is reached.

In one embodiment, the system further comprises a sensing device connected to a control device configured to control the moving mechanism and thus the re-positioning apparatus, where the sensing device is configured to sense at least one characteristic property of the carcass parts and where the control device is configured to schedule a processing sequence of the two or more food processing devices based on the at least one sensed characteristic property. It is thus now possible to, e.g. based on the size/shape/color/outer appearances to adjust the processing steps accordingly. This may as an example include only partly de-skin a particular side or sides of the carcass parts based on the sensed characteristic properties of the carcass parts. As an example, order requirements from customers may even be utilized as an additional input parameter in deciding on this processing sequence.

In one embodiment, the scheduled processing sequence includes part of the two or more food processing devices whereby the remaining food processing device(s) not participating in the processing sequence is/are bypassed by the carcass parts. This may as an example include performing multiple processing steps, such as cutting, sawing etc. but e.g. not de-skinning, where some of the carcass parts may pass the skinning device that may be automatically put in passive mode.

In one embodiment, the control device is further configured to adjust a rotational axis of the shackles before a first processing step of between processing steps. It is thus possible to automatically fully align the carcass parts for the next processing step and thus enhance the flexibility of the system.

In one embodiment, the at least one food processing device comprises an automatic food processing device for performing an automatic food processing step. This may include, but is not limited to, circular knife, saw blade, any type of de-skinner and/or de-fatter, knife. It should be noted that the pre-defined angular processing positions may additionally be obtained prior to a manual processing operation on the carcass part so as to facilitate and optimize the position of the carcass part for the operator.

In one embodiment, the engagement structure comprises one or more of:

a first support member and a second support member, where the support members are configured to engage with different sides of the carcass parts, or a suction device configured to engage the carcass parts and apply suction force on the carcass parts.

In one embodiment, the step of adjusting the angular position from an initial angular position to a pre-defined angular processing position is caused by a relative movement between the first support member and the second support member. The first support member may be positioned on an upstream side relative to the second support member and the conveying direction, where the initial distance there between exceeds the width of the part of the carcass parts where the support members engage. Initially, the upstream support member supplies some pressure on the carcass part, wherein there is a space between the other side of the carcass part and the second support member. This space is sufficient to allow the first support member to push onto the carcass part and adjust its angular position until it touches the second support member and is clamped between the first and the second support members. At this position, the pre-defined angular processing position is obtained, and it may be obtained until next processing step occurs. Accordingly, a simple mechanical solution is provided to automatically adjust the angular position.

In one embodiment, the moving mechanism comprises a carousel like structure having a vertical rotation axis.

In one embodiment, the at least one food processing device is selected from, but is not limited to, one or more of:
one or more rotating circular knife configured to perform a pre-cuts in the carcass parts,
a saw for sawing the carcass parts into smaller carcass parts, where the sawing may be performed at the pre-cut position,
a device for de-skinning and/or de-fatting at least a portion of the carcass parts.

In a second aspect of the present invention, a method is provided of processing carcass parts using a food processing system, where the food processing system comprises:
an overhang rail system comprising plurality of spaced apart shackles designed for carrying carcass parts such that the carcass parts are at least partly freely hanging,
a re-positioning apparatus comprising an engagement structure selectively moveable by a moving mechanism, and
at least one food processing device for performing at least one food processing step on the carcass parts while the carcass parts are conveyed past the at least one food processing device,
wherein the method comprises:
moving the spaced apart shackles and the engagement structure in a synchronized manner and engaging the carcass parts by the engagement structure at a position different from the carrying position of the shackle and adjusting the angular position relative to a vertical axis from an initial angular position to a pre-defined angular processing position. The pre-defined angular processing position may be adapted for the subsequent food processing step when the food processing step is carried out. Or, in other words, the pre-defined angular processing position may be optimized to the food processing step when the food processing step is carried out.

In an embodiment, the engagement structure moves in a closed loop path having a vertical rotation axis, where the synchronized movement is such that at an engaging area the engagement structure is positioned at the optimal position relative to an incoming shackle carrying a carcass part so as to allow the engagement structure to engage with a lower side of the carcass part. The initial angular position of the carcass parts when the engagement structure engages with the carcass parts is different from an angular position of the carcass parts when the at least one food processing step is carried out.

In an embodiment, multiple of processing steps are performed by two or more food processing devices, wherein each processing step has an associated pre-defined angular processing position such as a vertical position parallel to the vertical axis or any angular position non-parallel to the vertical axis.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figures 1A, 1B, 1C, 1D:
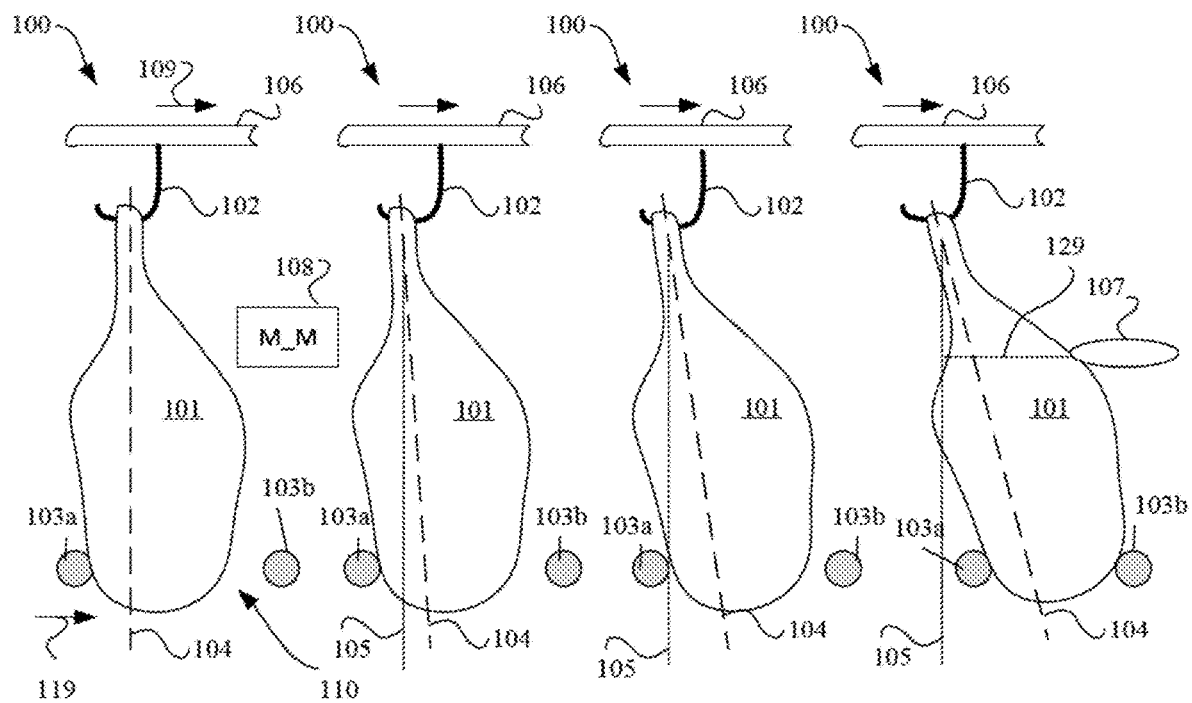
FIGS. 1(a) to 1(d) and FIGS. 2(a) to 2(c) depict graphically one embodiment of a system according to the present invention.

FIGS. 1(a) to 1(d) depicts graphically a system 100 according to the present invention for processing carcass parts of any four-legged animals, such as half carcasses, leg parts, hams, and shoulder parts of pigs.

The system comprises overhang rails system 106 comprising plurality of spaced apart shackles 102 designed for carrying carcass parts 101 such that the carcass parts are at least partly freely hanging.

The system further comprises a re-positioning apparatus comprising an engagement structure 103 selectively moveable by a moving mechanism 108, and at least one food processing device 107 for performing at least one food processing step on the carcass parts while the carcass parts are conveyed in a conveying direction 109 past at least one food processing device 107.

The plurality of spaced apart shackles 102 and the engagement structure move in a synchronized manner, as depicted in FIG. 1(a) where the engagement structure 103 is in line with the shackle 102 and engages with the carcass part 101 at a position different from the carrying position of the shackle.

The moving mechanism 108 is configured to advance the engagement structure 103 at least partly parallel to the conveying direction 109 in a direction indicated by arrow 119, either in the same direction or opposite direction, and/or in any direction that forms an angle relative to the conveying direction 109 (not shown).

In the embodiment shown here, the engagement structure comprises a first support member 103a and a second support member 103b, where the support members are configured to engage with different sides of the carcass parts as shown. The first support member 103a is positioned on an upstream side relative to the second support member 103b and the conveying direction 109, where the initial distance there between exceeds the width of the part of the carcass parts where the support members engage. Initially, the upstream support member 103a supplies some pressure on the carcass part, wherein there is a space 110 between the other side of the carcass part and the second support member 103b. This space is sufficient to allow the first support member to push onto the carcass part and adjust its angular position of a longitudinal axis 104 as shown in FIGS. 1(a)-1(c) relative to a vertical axis 105 from an initial angular position to a pre-defined angular processing position, where the pre-defined angular processing position is optimized to the food processing step when the food processing step is carried out. As shown here, the pre-defined angular position is shown in FIG. 1(d) where the carcass part 101 is clamped between the first and the second support members. At this position, the pre-defined angular processing position is obtained, and it may be obtained until next processing step occurs, e.g. where a cutting and/or a sawing operation is performed by a circular (or any other means) along an optimal cutting path 129.

It should be noted that the engagement structure 103 should not be construed as being limited to the two support members 103a),b), but it may also include any means configured to engage with the carcass parts and keep them in a steady position, such as via any means of vacuum or suction tool or clamp.

Figures 2A, 2B, 2C:
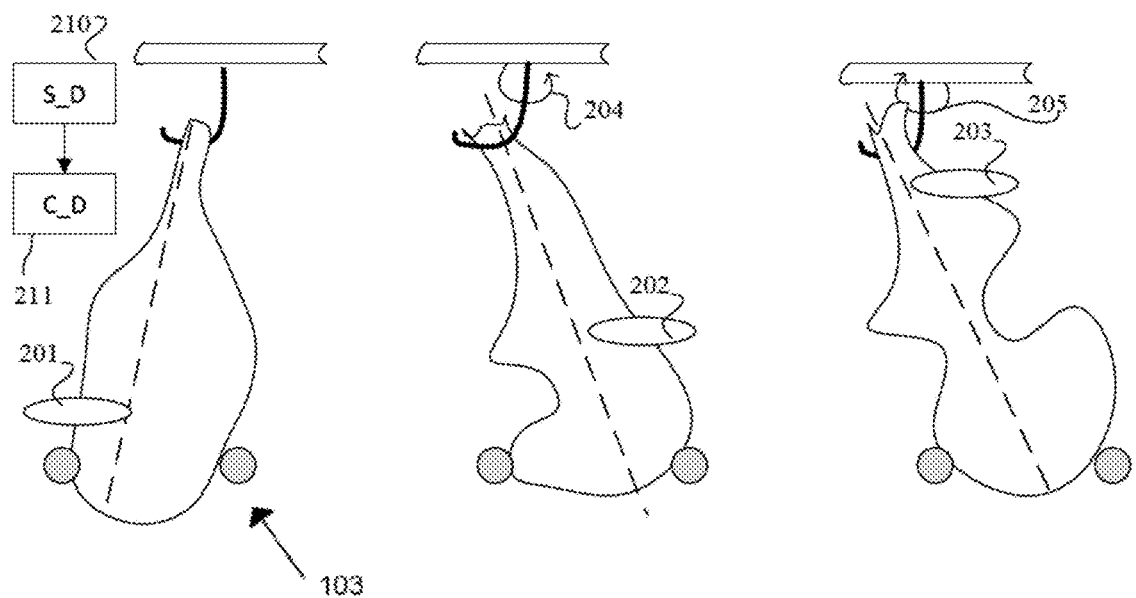

FIGS. 2(a) to 2(c) illustrated an embodiment of FIGS. 1(a) to 1(d) where several food processing devices 201-203 are additionally utilized in a sequence to perform different operations on the carcass parts, such as cutting, deboning or de-skinning or de-fatting operations may be performed fully or party automatically and even partly manually, with the aim of fully maximize the yield and/or fulfill customers preferences how e.g. the carcass part is cut, de-skinned and/or de-fat.

A sensing device 210 such as laser scanner, camera or any other sensing means is connected to a control device 211 that controls the moving mechanism 108 and thus re-positioning apparatus 103, where the sensing device 210 is configured to sense at least one characteristic property of the carcass parts and where the control device 211 is configured to schedule a processing sequence of the two or more food processing devices based on the at least one sensed characteristic property. It is thus now possible to, based on the size/shape/color/outer appearances to adjust the processing steps accordingly. This may as an example include only partly de-skin a particular side or sides of the carcass parts based on the sensed characteristic properties of the carcass parts. As an example, order requirements from customers may even be utilized as an additional parameter in deciding on this processing sequence.

The scheduled processing sequence may include only part of the food processing devices 201-203 where some of them may not participate in the processing sequence and be bypassed.

As shown in this embodiment, the control device 211 may further be configured to adjust a rotational axis of the shackles between processing steps, e.g. counter-clockwise 204 before a processing step 202, and clockwise 205 before processing step 203. It is thus possible to automatically fully align the carcass parts for the next processing step and thus enhance the flexibility of the system.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A food processing system comprising:
    an overhang rail system comprising plurality of spaced apart shackles designed for carrying carcass parts such that the carcass parts are at least partly freely hanging,
    a re-positioning apparatus comprising an engagement structure selectively moveable by a moving mechanism, and
    at least one food processing device for performing at least one food processing step on the carcass parts while the carcass parts are conveyed past the at least one food processing device,
    wherein the plurality of spaced apart shackles and the engagement structure move in a synchronized manner,
    wherein the engagement structure is configured to engage the carcass parts at a position different from the carrying position of the shackle and adjusting the angular position relative to a vertical axis from an initial angular position to a pre-defined angular processing position.

2. The food processing system according to claim 1, wherein the at least one food processing device includes two or more food processing devices having associated two or more different pre-defined angular processing positions.

3. The food processing system according to claim 1, further comprising a sensing device connected to a control device configured to control the moving mechanism and thus the re-positioning apparatus, where the sensing device is configured to sense at least one characteristic property of the carcass parts and where the control device is configured to schedule a processing sequence of the two or more food processing devices based on the at least one sensed characteristic property.

4. The food processing system according to claim 3, wherein the scheduled processing sequence includes part of the two or more food processing devices whereby the remaining food processing device(s) not participating in the processing sequence is/are bypassed by the carcass parts.

5. The food processing system according to claim 3, wherein the control device is further configured to adjust a rotational axis of the shackles before a first processing step of between processing steps.

6. The food processing system according to claim 1, wherein the at least one food processing device comprises automatic food processing device for performing an automatic food processing step.

7. The food processing system according to claim 1, wherein the engagement structure comprises one or more of:
    a first support member and a second support member, where the support members are configured to engage with different sides of the carcass parts, or
    a suction device configured to engage the carcass parts and apply suction force on the carcass parts.

8. The food processing system according to claim 7, wherein adjusting the angular position from an initial angular position to a pre-defined angular processing position is caused by a relative movement between the first support member and the second support member.

9. The food processing system according to claim 1, wherein the moving mechanism comprises a carousel like structure having a vertical rotation axis.

10. The food processing system according to claim 1, wherein the at least one food processing device is selected from one or more of:
    one or more rotating circular knife configured to perform a pre-cuts in the carcass parts, a saw for sawing the carcass parts into smaller carcass parts, where the sawing may be performed at the pre-cut position, a device for de-skinning and/or de-fatting at least a portion of the carcass parts.

11. A method of processing carcass parts using food processing a food processing system, where the food processing system comprises:

an overhang rail system comprising plurality of spaced apart shackles designed for carrying carcass parts such that the carcass parts are at least partly freely hanging, a re-positioning apparatus comprising an engagement structure selectively moveable by a moving mechanism, and at least one food processing device for performing at least one food processing step on the carcass parts while the carcass parts are conveyed past the at least one food processing device, wherein the method comprises:

moving the spaced apart shackles and the engagement structure in a synchronized manner and engaging the carcass parts by the engagement structure at a position different from the carrying position of the shackle and adjusting the angular position relative to a vertical axis from an initial angular position to a pre-defined angular processing position.

12. The method according to claim 11, wherein the engagement structure moves in a closed loop path having a vertical rotation axis.

13. The method according to any of the claim 11, wherein multiple of processing steps are performed by two or more food processing devices, wherein each processing step has an associated pre-defined angular processing position such as a vertical position parallel to the vertical axis or any angular position non-parallel to the vertical axis.

14. The method according to claim 11, wherein the carcass parts are from slaughtered four-legged animals.

* * * * *